(12) United States Patent
Sugimoto (10) Patent No.: US 9,210,609 B2
(45) Date of Patent: Dec. 8, 2015

(54) COMMUNICATION SYSTEM

(75) Inventor: Koji Sugimoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 108 days.

(21) Appl. No.: 14/117,753

(22) PCT Filed: May 30, 2011

(86) PCT No.: PCT/JP2011/062408
§ 371 (c)(1),
(2), (4) Date: Nov. 14, 2013

(87) PCT Pub. No.: WO2012/164668
PCT Pub. Date: Dec. 6, 2012

(65) Prior Publication Data
US 2014/0092802 A1    Apr. 3, 2014

(51) Int. Cl.
| | | |
|---|---|---|
| H04H 20/71 | (2008.01) |
| H04L 12/28 | (2006.01) |
| H04J 3/26 | (2006.01) |
| H04M 1/66 | (2006.01) |
| H04W 28/04 | (2009.01) |
| H04L 12/18 | (2006.01) |
| H04W 74/04 | (2009.01) |
| H04L 12/417 | (2006.01) |
| H04L 1/18 | (2006.01) |
| H04L 1/00 | (2006.01) |

(52) U.S. Cl.
CPC ........... *H04W 28/044* (2013.01); *H04L 1/1854* (2013.01); *H04L 12/18* (2013.01); *H04L 12/417* (2013.01); *H04W 74/04* (2013.01); *H04L 1/1896* (2013.01); *H04L 2001/0093* (2013.01)

(58) Field of Classification Search
USPC .................................. 370/312, 390; 455/411
See application file for complete search history.

(56) References Cited

U.S. PATENT DOCUMENTS

| | | | |
|---|---|---|---|
| 2005/0078678 A1* | 4/2005 | Kim et al. ...................... | 370/390 |
| 2008/0064368 A1* | 3/2008 | Yamashita et al. ............ | 455/411 |

FOREIGN PATENT DOCUMENTS

| | | |
|---|---|---|
| JP | 8 340573 | 12/1996 |
| JP | 2008 48056 | 2/2008 |
| JP | 2009 302749 | 12/2009 |
| JP | 2010 213162 | 9/2010 |

OTHER PUBLICATIONS

International Search Report Issued Jun. 21, 2011 in PCT/JP11/062408 Filed May 30, 2011.

* cited by examiner

*Primary Examiner* — Kiet Tang
(74) *Attorney, Agent, or Firm* — Oblon, McClelland, Maier & Neustadt, L.L.P.

(57) ABSTRACT

The purpose of this invention is to provide a technique for preventing collisions between a numerous response packets generated in broadcast communication. A communication device (A1-A16) transmits a response packet (220) using a time slot corresponding to the terminal number (A1-A16) of the device, in response to a broadcast packet (210) transmitted from an information processing unit (20). The information processing unit (20) transmits a broadcast retransmission packet (230) including information representing the terminal numbers of communication devices that have succeeded in transmitting a response packet. Among communication devices that have received the broadcast retransmission packet (230), the communication devices that require retransmission transmit a retransmission response packet (240) using the time slot of another randomly selected device.

4 Claims, 8 Drawing Sheets

| Group G1 | Subgroup SG1 | Terminal number A1, A2, A5-A7 |
|---|---|---|
| | Subgroup SG2 | Terminal number A8-A11 |
| | Subgroup SG3 | Terminal number A12-A18 |

FIG. 11

COMMUNICATION SYSTEM

TECHNICAL FIELD

The present invention relates to a technique for preventing collisions of response packets in multicasting.

BACKGROUND ART

Relatively small networks, such as local area networks (LANs), may use multicasting. Multicasting includes, for example, transmitting a broadcast packet or a multicast packet to all the communication devices connected to the network.

For example, a server may transmit a broadcast packet to multiple communication devices, requesting responses from those devices to the broadcast packet. In this case, the server receives response packets from many communication devices.

If many communication devices transmit response packets to the server at a time, the packets may collide with one another on the network, increasing the likelihood of errors occurring in the communication. Techniques have been proposed to allow, for example, such multiple communication devices to transmit response packets to the server at different times by time sharing.

Patent Literature 1 describes communication in which a polling packet is transmitted from an information processing unit and is received by multiple mobile stations. Each mobile station transmits a response to the information processing unit by using a timeslot that has been determined based on random numbers.
Patent Literature 1: Japanese Unexamined Patent Publication No. 8-340573

The technique described in Patent Literature 1 reduces the likelihood of collisions between responses transmitted from multiple mobile stations. However, despite its use of random numbers, this technique can increase the likelihood of response collisions if the response period assigned to each mobile station is short.

DISCLOSURE OF INVENTION

A communication system of the present invention includes a transmitter, and first to N-th receivers, which each receive a broadcast packet transmitted from the transmitter. Each receiver includes a setting unit and a response control unit. The setting unit of each receiver sets identification information for uniquely identifying the receiver. The response control unit transmits, when receiving the broadcast packet, a response packet to the transmitter by using a timeslot unique to the receiver that is determined based on the identification information set in the setting unit.

This system reduces the likelihood of collisions between response packets.

In preferred embodiments of the present invention, the transmitter includes a retransmission control unit. When the transmitter that has transmitted the broadcast packet fails to receive a response packet from any one of the receivers, the retransmission control unit transmits a broadcast retransmission packet, which stores response confirmation information including identification information identifying all receivers that have successfully transmitted responses, to the first to N-th receivers. A response control unit includes a determination unit and a retransmission response control unit. The determination unit refers to the response confirmation information and determines whether the response packet transmitted from the receiver has been received by the transmitter. When determining that the response packet transmitted from the receiver fails to be received by the transmitter, the retransmission response control unit transmits a retransmission response packet to the transmitter by using a timeslot unique to another receiver that is determined based on identification information identifying the other receiver that has successfully transmitted a response.

If, for example, the identification information of one receiver is set erroneously for a plurality of receivers in an overlapping manner, this system prevents retransmission response packets from being retransmitted by using the same timeslot.

It is an object of the present invention to provide a technique for preventing collisions of many response packets transmitted in response to multicasting.

The objects, features, aspects and advantages of the present invention will become apparent from the following description, taken in conjunction with the accompanying drawings.

DESCRIPTION OF THE PREFERRED EMBODIMENTS

First Embodiment

Configuration of Communication System and Communication Device

Figure 1:
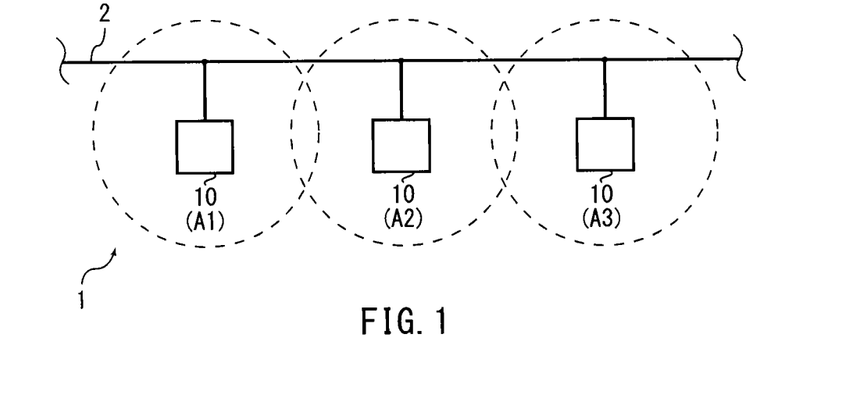
FIG. 1 shows the network configuration of a communication system 1.

Embodiments of the present invention will now be described with reference to the drawings. FIG. 1 schematically shows the overall configuration of a communication system 1 according to a first embodiment. The communication system 1 combines power line communication (PLC) and wireless communication. The communication system 1 is installed, for example, in an ordinary house.

As shown in FIG. 1, three communication device A1, A2, and A3 are connected to a power line 2. The communication devices A1, A2, and A3, which are connected to the power line 2, can perform both power line communication and wireless communication. The communication devices A1, A2, and A3 are identical, and may be collectively referred to as a communication device 10 or communication devices 10 when their common functions are described.

In FIG. 1, the areas indicated by dotted lines around the communication devices A1, A2, and A3 are the wireless communication areas of the communication devices A1, A2, and A3. In the illustrated example, wireless communication is enabled between the communication device A1 and the communication device A2, and between the communication device A2 and the communication device A3. In the present embodiment, wireless communication is performed by using a specific low-power wireless technique. The communication device 10 operates as a specific low-power wireless station.

Figure 2:
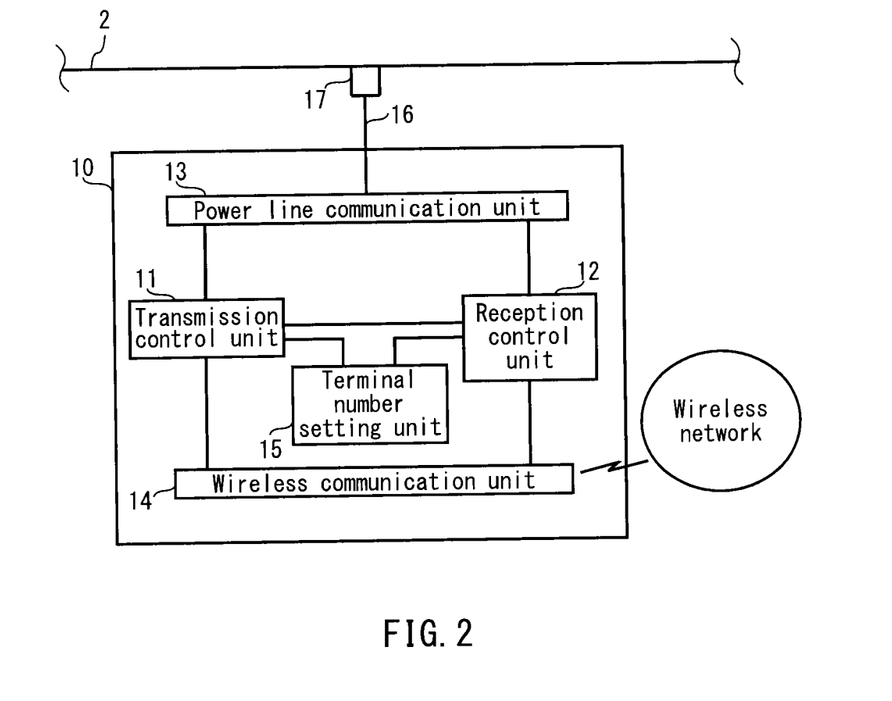
FIG. 2 is a functional block diagram of a communication device 10.

FIG. 2 is a functional block diagram of the communication device 10. The communication device 10 includes a transmission control unit 11, a reception control unit 12, a power line communication unit 13, a wireless communication unit 14, and a terminal number setting unit 15. A cable 16 is connected to the power line communication unit 13. The cable 16 is connected to the power line 2 to electrically connect the communication device 10 to the power line 2. The cable 16 is connected to the power line 2 via a plug 17. The communication device 10 is compact, and the plug 17, which is incorporated in the body of the communication device 10, is connected to an outlet of the power line 2 to enable power line communication of the communication device 10. The communication device 2 is supplied with power via the cable 16.

The wireless communication unit 14 includes a wireless module and an antenna for wireless communication, and performs specific low-power wireless communication with another communication device 10 arranged in a neighboring area.

The transmission control unit 11 controls transmission of a communication packet, which involves the power line communication unit 13 and the wireless communication unit 14. When intending to transmit a communication packet to another communication device 10, the transmission control unit 11 instructs the power line communication unit 13 and the wireless communication unit 14 to transmit communication packets carrying the same information. More specifically, two communication packets carrying the same information are transmitted to the other communication device 10 by using two communication media, that is, cable communication and wireless communication.

The reception control unit 12 processes the communication packets received via the power line communication unit 13 and the wireless communication unit 14. To maintain the reliability of communication, the reception control unit 12 determines the validity of each of the received communication packets. Such validity determination is enabled by a checksum embedded in every communication packet to be transmitted in the communication system 1.

The terminal number setting unit 15 stores a terminal number set for the communication device 10. Among the many communication devices 10 connected to the communication system 1, each communication device 10 is given a unique terminal number for identifying the communication device.

Basic Rules of Communication Procedure

Figure 3:
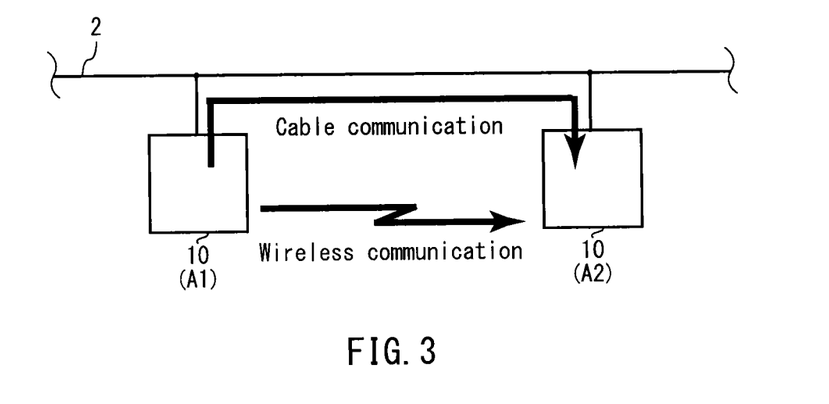
FIG. 3 shows the basic rules of a communication procedure according to embodiments.

The basic rules of the communication procedure used by the communication system 1 will now be described. As described above, the transmission control unit 11 instructs the power line communication unit 13 and the wireless communication unit 14 to transmit communication packets carrying the same information. FIG. 3 shows the communication in which the communication device A1 transmits communication packets to the communication device A2. In this manner, the communication packets carrying the same information are transmitted by using both cable communication and wireless communication. Even when one of the communication media undergoes deteriorating communication conditions, this method allows the other communication medium to complete the communication.

In the example illustrated in FIG. 3, the communication device A1 has a new request to transmit a communication packet to the communication device A2. More specifically, the communication device A1 is a transmission source terminal, whereas the communication device A2 is a transmission destination terminal. Unlike this, FIG. 4 illustrates an example in which the communication device A2 functions as a relay.

Figure 4:
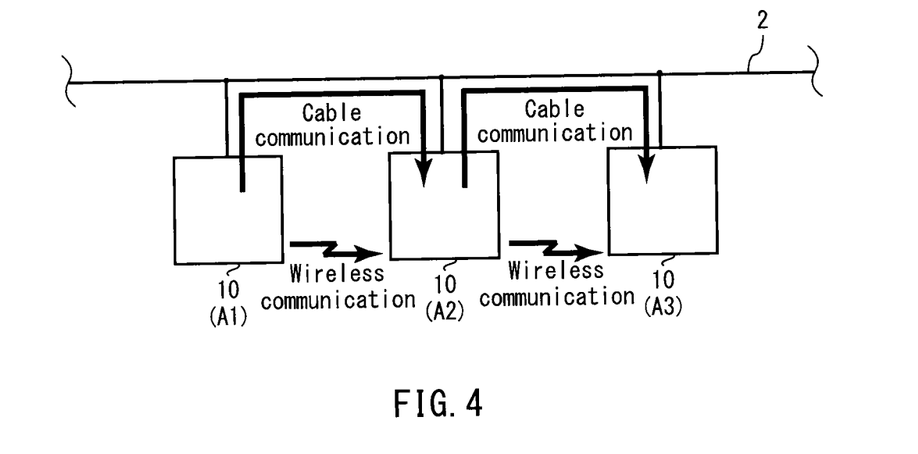
FIG. 4 shows the basic rules of a communication procedure according to the embodiments.

In the example illustrated in FIG. 4, the communication device A1 has a new request to transmit a communication packet to the communication device A3. The communication device A1 transmits communication packets carrying the same information and designating the communication device A3 as their destination by using both cable communication and wireless communication. These communication packets are received first by the communication device A2. The communication device A2 determines the validity of each of the received communication packets. When determining that the communication packets are valid, the communication device A2 relays the communication packets toward the destination, which is the communication device A3. The communication device A2 relays the communication packets carrying the same information by using both cable communication and wireless communication.

When receiving the communication packet transmitted by either cable communication or wireless communication, the communication device 10 determines the validity of the received communication packet by using the checksum included in the packet. When determining that the communication packet is valid, the communication device 10 processes the received communication packet as a valid packet. The communication packets carrying the same information transmitted from the communication device 10 by cable communication and wireless communication are given the same sequence number, as described later. If the communication device 10 receives a communication packet that is given the same sequence number as a previously received and processed communication packet for which the validity has been determined, the communication device 10 abandons the received communication packet.

Alternatively, the communication device 10 may process any communication packet as a valid packet only after determining the validity of such communication packets that are given the same sequence number transmitted by both cable communication and wireless communication.

When receiving a broadcast packet, the communication device 10 also determines the validity of the broadcast packet. When determining that the broadcast packet is valid, the communication device 10 relays such broadcast packets carrying the same information by both cable communication and wireless communication.

As described above, the communication device 10 transmits communication packets carrying the same information to the destination communication device 10 by using both cable communication and wireless communication when the communication device is a source from which the communication packets are to be transmitted newly, as well as when the communication device functions as a relay that transmits such communication packets designating another communication device as the destination. This configuration improves the likelihood of successful communication even when any of the communication media undergoes deteriorating communication conditions.

The communication procedure may be modified in the following form. When receiving a communication packet transmitted by cable communication, the communication device may relay the received communication packet by using only wireless communication. Only when receiving a communication packet by wireless communication, the communication device may relay the received communication packet by using both cable communication and wireless communication.

Figure 5:
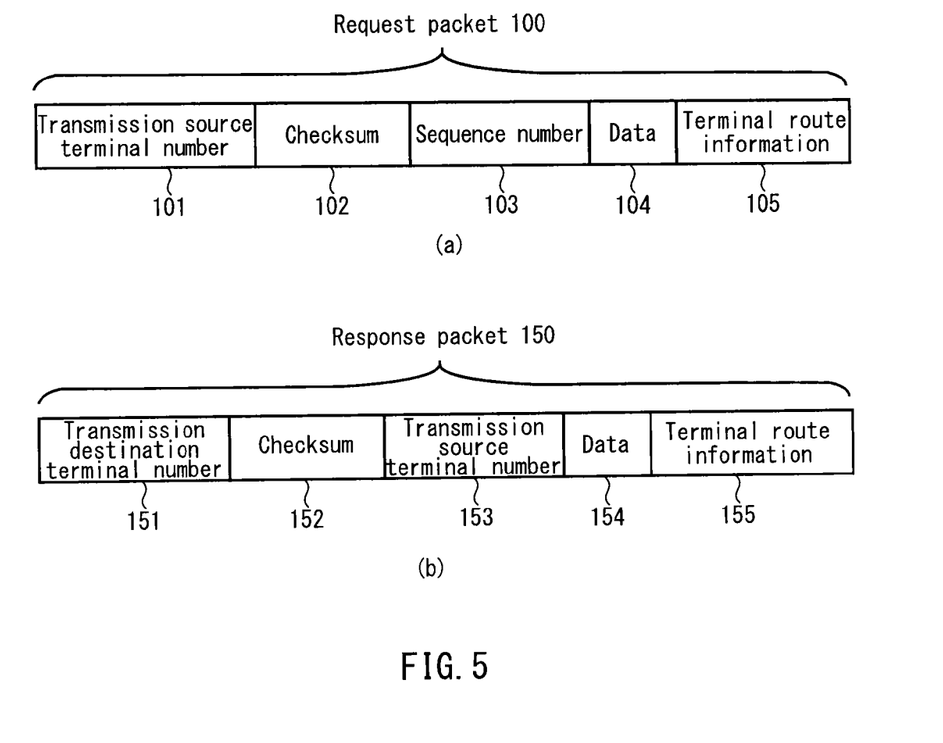
FIG. 5 shows the structures of communication packets.

FIG. 5 shows the structures of communication packets transmitted and received in the communication system 1. FIG. 5(*a*) shows the structure of a request packet 100. FIG. 5(*b*) shows the structure of a response packet 150. The request packet 100 includes a transmission destination terminal number field 101, a checksum field 102, a sequence number field 103, a data field 104, and a terminal route information field 105. The response packet 150 includes a transmission destination terminal number field 151, a checksum field 152, a transmission source terminal number field 153, a data field 154, and a terminal route information field 155.

The transmission destination terminal number fields 101 and 151, and the transmission source terminal number field 153 each store a terminal number set for uniquely identifying the communication device 10. In the present embodiment, the assigned terminal number is A1 for the communication device A1, A2 for the communication device A2, and A3 for the communication device A3.

The checksum fields 102 and 152 store an error detecting code for determining the validity of the communication packets 100 and 150. The error detecting code, which is a checksum in one example, may alternatively be a code value used for cyclic redundancy check (CRC) or a Hash value of the MD5 message-digest algorithm.

The sequence number field 103 stores a number that uniquely identifies the request packet 100. The sequence number is generated by the transmission source terminal of the request packet 100, and is embedded in the request packet 100. The sequence number, which uniquely identifies the request packet 100, may be generated by, for example, combining information unique to the terminal and a sequential number. As described above, when the communication device 10 transmits request packets 100 carrying the same information by using both cable communication and wireless communication, these two request packets 100 are given the same sequence number. When relaying the request packet 100 received from another communication device, the communication device 10 does not change the sequence number of the request packet 100. The same sequence number is used for the request packet throughout the communication from the transmission source device to the destination communication device 10. However, when the packet is to be retransmitted by the transmission source device, the packed is given a new sequence number.

The data fields 104 and 154 store commands or data. The communication device 10, which receives the request packet 100, reads the data stored in the data field 104 to process the received request packet. The communication device 10 records a response message in the data field 154 and then transmits the response packet 150.

Figure 6:
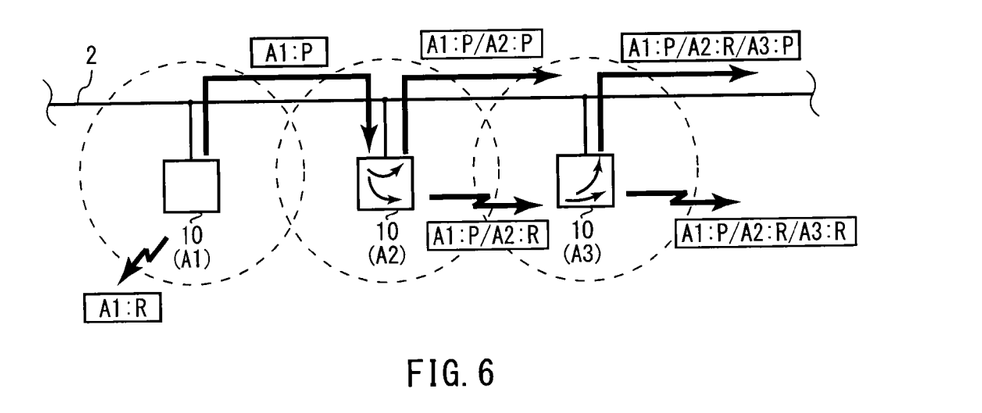
FIG. 6 shows example records of terminal route information.

The terminal route information fields 105 and 155 store records of the communication device 10 that has relayed the request packet 100. FIG. 6 shows an example of such terminal route information. In this example, the request packet 100, which is a broadcast packet, is transmitted from the communication device A1.

First, the communication device A1 transmits the request packet 100, which is a broadcast packet, by both cable communication and wireless communication. The request packet 100 transmitted by cable communication is recorded as terminal route information "A1:P." In this notation, "A1" indicates the terminal number of the transmission source communication device A1, and P indicates cable communication (power line communication in this example). The request packet 100 transmitted by wireless communication is recorded as terminal route information "A1:R." In this notation, "R" indicates wireless communication (specific low-power wireless communication).

Subsequently, the communication device A2 that has received the request packet 100 via the power line 2 relays the request packet 100 by both cable communication and wireless communication. The communication device A2 relays the received request packet 100 as a broadcast packet. For the request packet 100 transmitted by cable communication, terminal route information "A1:P/A2:P" is recorded. The record indicates that the communication device A2 has relayed the request packet 100 by cable communication, following the transmission performed by the transmission source communication device A1. For the request packet 100 transmitted by wireless communication, terminal route information "A1:P/A2:R" is recorded.

Subsequently, the communication device A3, which has received the request packet 100 transmitted from the communication device A2 by wireless communication, relays the request packet 100 by both cable communication and wireless communication. The communication device A3 relays the received request packet 100 as a broadcast packet. For the request packet 100 transmitted by cable communication, terminal route information "A1:P/A2:R/A3:P" is recorded. The record indicates that the communication device A3 has relayed the request packet 100 by cable communication, following the transmission performed by the communication device A2. For the request packet 100 transmitted by wireless communication, terminal route information "A1:P/A2:R/A3:R" is recorded.

As described above, the terminal route information field 105 stores the record of the route on which the request packet 100 has been transferred. The terminal route information field 155 of the response packet 150 stores the same route information as recorded in the request packet 100. One method to transmit the response packet 150 from the communication device 10 to reach the transmission source device is to transmit the response packet 150 through the reverse route of the route recorded in the terminal route information field 155. More specifically, successful communication is highly likely to be achievable by transmitting packets through the reverse route of the route to the destination, on which the successful transfer has been performed.

In the example shown in FIG. 6, all the request packets 100 transmitted and relayed are given the same sequence number.

Response Process for Broadcast Packet

Figure 7:
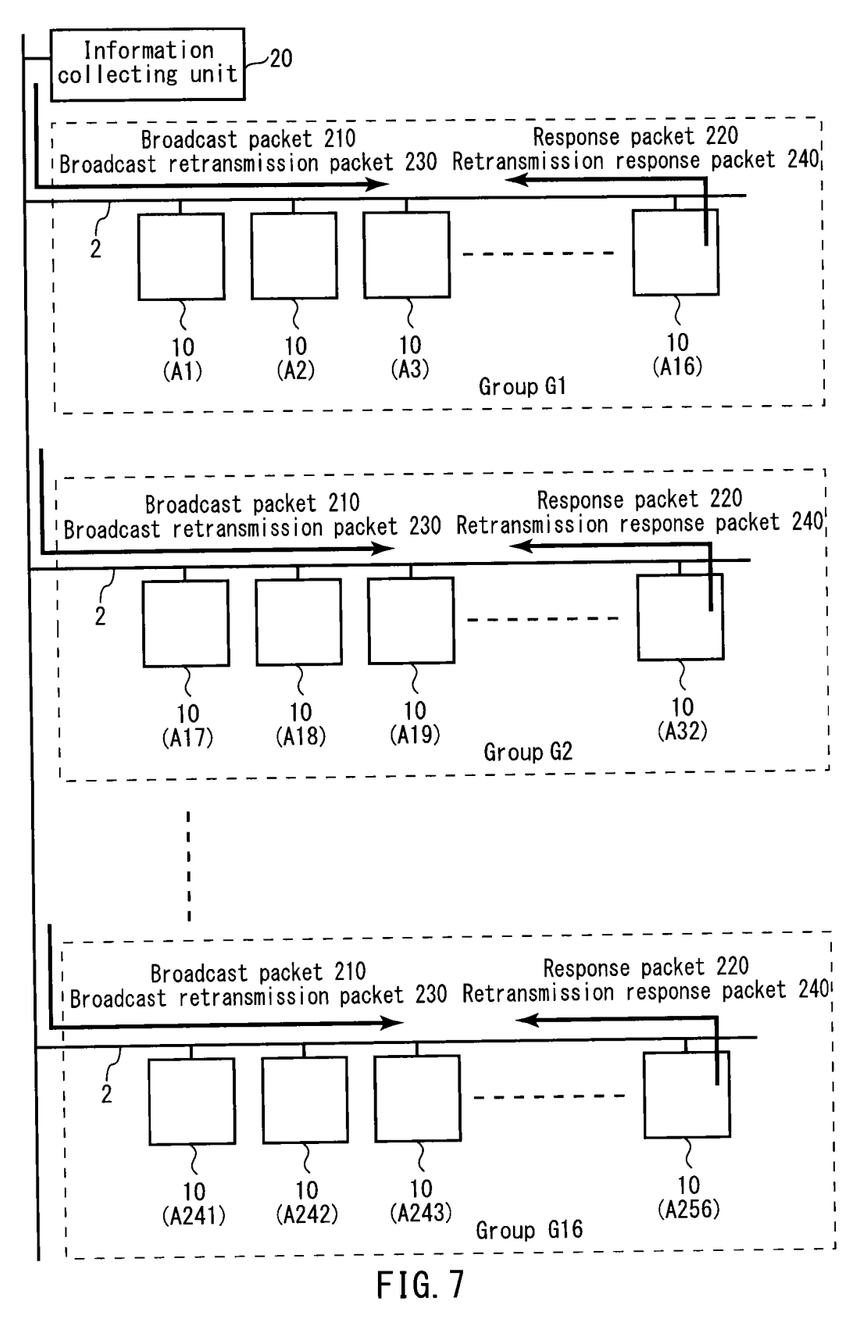
FIG. 7 shows the grouping performed in the communication system and terminal numbers (identification information) of the communication devices.

The processing performed in response to a broadcast packet, which constitutes the features of the present invention, will now be described. FIG. 7 shows all the communication devices 10 connected to the communication system 1 and an information collecting unit 20. The information collecting unit 20 is connected to the power line 2, and is capable of performing power line communication. The information collecting unit 20 collects information from each communication device 10. The information collecting unit 20 can transmit the collected information to an external device, such as an external server.

Two hundred and fifty six communication devices 10 are connected to the communication system 1. The 256 communication devices 10 (A1 to A256) are divided into 16 groups.

The group G1 includes communication devices A1 to A16. The group A2 includes communication devices A17 to A32. Likewise, every subsequent group includes 16 communication devices, and the group G16 includes communication devices A241 to A256.

The information collecting unit 20 transmits a broadcast packet 210 to all the communication devices 10 to collect information from each of these devices. Each communication device 10 transmits a response packet 220 in response to the broadcast packet 210. When an error occurs in the communication, the information processing unit 20 transmits a broadcast retransmission packet 230 to all the communication devices 10. Any communication device 10 that needs to retransmit information transmits a retransmission response packet 240 in response to the broadcast retransmission packet 230.

When response packets 220 and/or retransmission response packets 240 are transmitted from the 256 communication devices 10 at a time, the response packets 220 and/or the retransmission response packets 240 are likely to collide with one another. The communication system 1 of the present embodiment prevents such collisions between the response packets 220 and/or between the retransmission response packets 240 by performing the control described below.

A first technique will now be described. The information collecting unit 20 transmits a broadcast packet 210 to each group of communication devices. More specifically, the information collecting unit 20 first transmits a broadcast packet 210 to the group G1. After completing the processing with all the communication devices A1 to A16 belonging to the group G1, the information collecting unit 20 next transmits a broadcast packet 210 to the group G2. The broadcast packet 210, which is received by each of all the communication devices A1 to A256, contains information indicating that the packet targets only the communication devices A1 to A16 belonging to the group G1. The communication devices 10 belonging to groups other than the group G1 abandon the received broadcast packet 210.

After completing the processing with all the communication devices A17 to A32 belonging to the group G2, the information collecting unit 20 next transmits a broadcast packet 210 to the group G3. This processing is repeated to complete the processing with all the communication devices A1 to A256 belonging to the groups G1 to G16. The broadcast packet 210 is transmitted to communication devices 10 belonging to each group, instead of being transmitted to all the 256 communication devices at a time. This control reduces the likelihood of collisions between the response packets 220.

Figure 8:
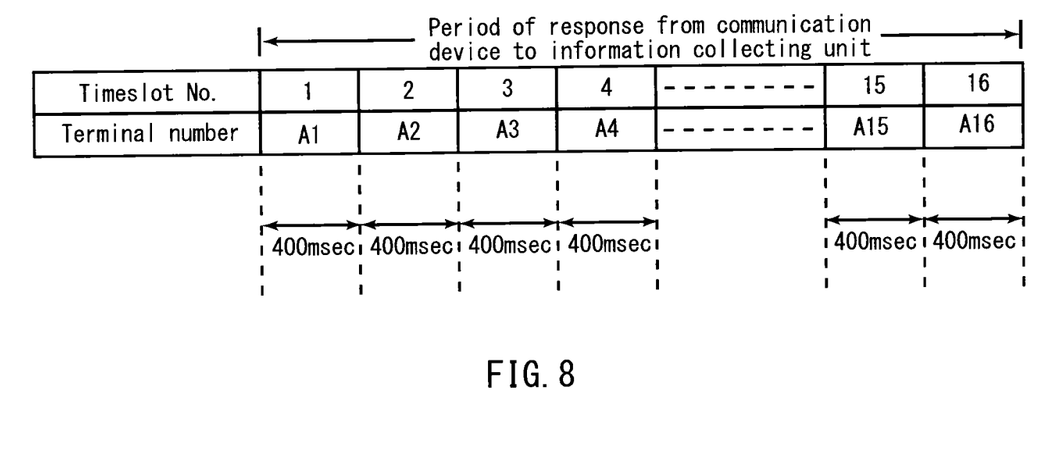
FIG. 8 shows the transmission timing of response packets in a first embodiment.

A second technique will now be described. Each communication device 10 transmits a response packet 220 by using a timeslot determined based on its terminal number. FIG. 8 shows the timeslots assigned to the communication device A1 to A16 belonging to the group G1. Each communication device 10 determines the timeslot to be used to transmit a response packet 220 based on its terminal number set in its terminal number setting unit 15.

The communication device A1 is assigned with a timeslot numbered 1, which defines a response period immediately after reception of the broadcast packet 210. The communication device A2 is assigned with a timeslot numbered 2, which defines a response period 400 milliseconds after the reception of the broadcast packet 210. Likewise, the communication devices A3, A4 . . . are assigned with timeslots that define response periods that are 800 milliseconds, 1200 milliseconds, . . . after the reception of the broadcast packet 210. The communication device A16 is assigned with a timeslot numbered 16, which defines a response period 6000 milliseconds (400×15=6000) after the reception of the broadcast packet 210.

As described above, each communication device 10 transmits a response packet 220 in response to the broadcast packet 210 by using the timeslot determined based on its terminal number. Each communication device 10 is given a terminal number that uniquely identifies the communication device 10. In normal cases, the response packets 220 from the multiple communication devices 10 are transmitted at intervals of 400 milliseconds. Such packets are unlikely to collide with one another.

With the techniques described above, the information collecting unit 20 transmits the broadcast packet 210 to the communication devices A1 to A16 belonging to the group G1, and receives response packets 220 from the communication devices A1 to A16. Subsequently, the information collecting unit 20 transmits the broadcast packet 210 to the group G2. Likewise, the communication devices A17 to A32 belonging to the group G2 transmit response packets 220 to the information collecting unit 20 by using the timeslots numbered 1 to 16. Likewise, the information collecting unit 20 performs the broadcast for the groups G3 to G16.

A third technique will now be described. To request retransmission, the communication device 10 transmits a retransmission response packet 240 by using another timeslot. As described above with the second technique, the response packets 220 from the multiple communication devices 10 are transmitted at intervals of 400 milliseconds in normal cases, and thus these response packets are unlikely to collide with one other. However, an erroneous terminal number may be set in the terminal number setting unit 15 of one communication device.

For example, the terminal number A4 is assumed to be erroneously set in the terminal number setting unit 15 of the communication device A3. The terminal number A4 is correctly set in the terminal number setting unit 15 of the communication device A4. In this case, the communication device A3 and the communication device A4 both use the timeslot numbered 4 to transmit their response packets 220. In this case, these response packets 220 can collide with each other.

Figure 9:
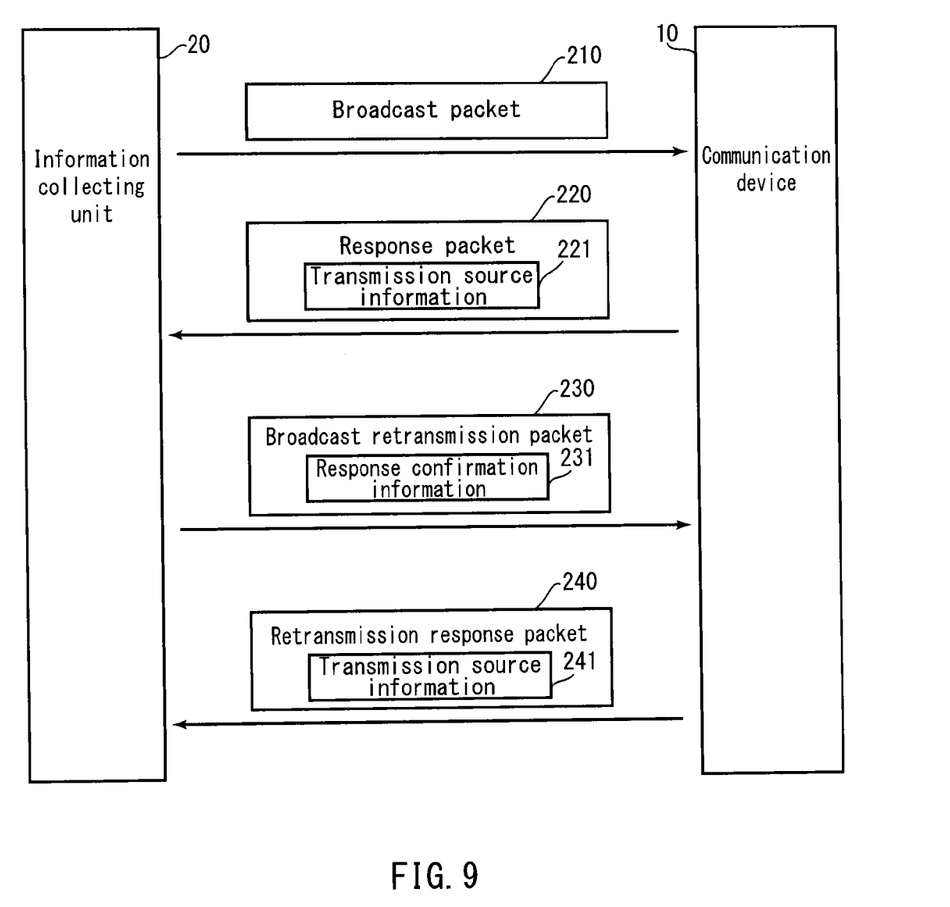
FIG. 9 shows a sequence of communication between an information processing unit and a communication device.

As shown in FIG. 9, the response packet 220 transmitted from each communication device 10 to the information collecting unit 20 stores transmission source information 221, which corresponds to the information stored in the transmission source terminal number field 153 of the response packet 150 shown in FIG. 5(b). The information collecting unit 20 can identify the terminal numbers of the communication devices 10 that have successfully transmitted their responses by referring to the received response packets 220.

When, for example, the terminal number A4 is erroneously set in the terminal number setting unit 15 of the communication device A3, and the response packets 220 transmitted from the communication devices A3 and A4 collide with each other, the information collecting unit 20 fails to receive the response packets 220 from the communication devices A3 and A4, whereas the information collecting unit 20 successfully receives response packets 220 from the other communication devices A1, A2, and A5 to A16.

After failing to receive the response packets 220 from the communication devices A3 and A4, the information collecting unit 20 retransmits a broadcast packet to the group G1. As shown in FIG. 9, the broadcast retransmission packet 230 stores the response confirmation information 231 indicating the terminal numbers of the communication devices 10 that have already successfully transmitted their response packets 220. In the above example, the broadcast retransmission packet 230 stores the response confirmation information 231 identifying the terminal numbers A1, A2, and A5 to A16.

When receiving the broadcast retransmission packet 230, each communication device 10 refers to the response confirmation information 231, and determines whether the communication device has successfully transmitted its response. When determining that the communication device has successfully transmitted its response, the communication device abandons the received broadcast retransmission packet 230. In the above example, the communication devices A1, A2, and A5 to A16 abandon the received broadcast retransmission packet 230.

When determining that the communication device has failed in transmitting its response, or specifically when determining that its terminal number is not included in the response confirmation information 231, the communication device transmits a retransmission response packet 240 to the broadcast retransmission packet 230. In the above example, the communication devices A3 and A4 each transmit the retransmission response packet 240.

If the communication devices A3 and A4 use the timeslot numbered 4 again to transmit their retransmission response packets 240, the retransmission response packets 240 are likely to collide with each other. To prevent such collision in transmitting the retransmission response packet 240, each of these communication devices 10 uses the terminal number of another communication device, instead of using its terminal number.

The communication device 10 randomly selects one of the terminal numbers A1 to A16. When the randomly selected terminal number is included in the response confirmation information 231, the communication device transmits the retransmission response packet 240 by using the timeslot corresponding to the selected terminal number. For example, when the randomly selected terminal number is the terminal number A9, the communication device A3 uses the timeslot numbered 9 to transmit the retransmission response packet 240. Likewise, the communication device A4 also uses the timeslot corresponding to the randomly selected terminal number. When the randomly selected terminal number is not included in the response confirmation information 231, the communication device again randomly selects a terminal number.

As described above in the present embodiment, each communication device first transmits the response to the broadcast packet 210 by using the timeslot determined based on its terminal number, but retransmits the response by using the timeslot corresponding to the terminal number of another communication device. This prevents the collisions between retransmission response packets 240 when, for example, the same terminal number is erroneously set in a plurality of communication devices 10. The retransmission response packet 240 also stores the transmission source information 241 identifying the terminal number of the transmission source communication device 10. If the retransmission response packets 240 further collide with each other, the information collecting unit 230 again transmits a broadcast retransmission packet 230 and the communication device 10 again transmits a retransmission response packet 240, although such collision is less likely.

Second Embodiment

A second embodiment of the present invention will now be described. The second embodiment is a modification from the first embodiment. In the second embodiment, the communication system 1 has the same configuration and the communication device 10 has the same configuration and the same functions as in the first embodiment described with reference to FIGS. 1 to 7.

In the first embodiment, the retransmission response packet 240 is transmitted in response to the broadcast retransmission packet 230 by using the timeslot determined based on the randomly selected terminal number of another communication device. The second embodiment prepares two timeslots determined based on the randomly selected terminal number of another communication device.

Figure 10:
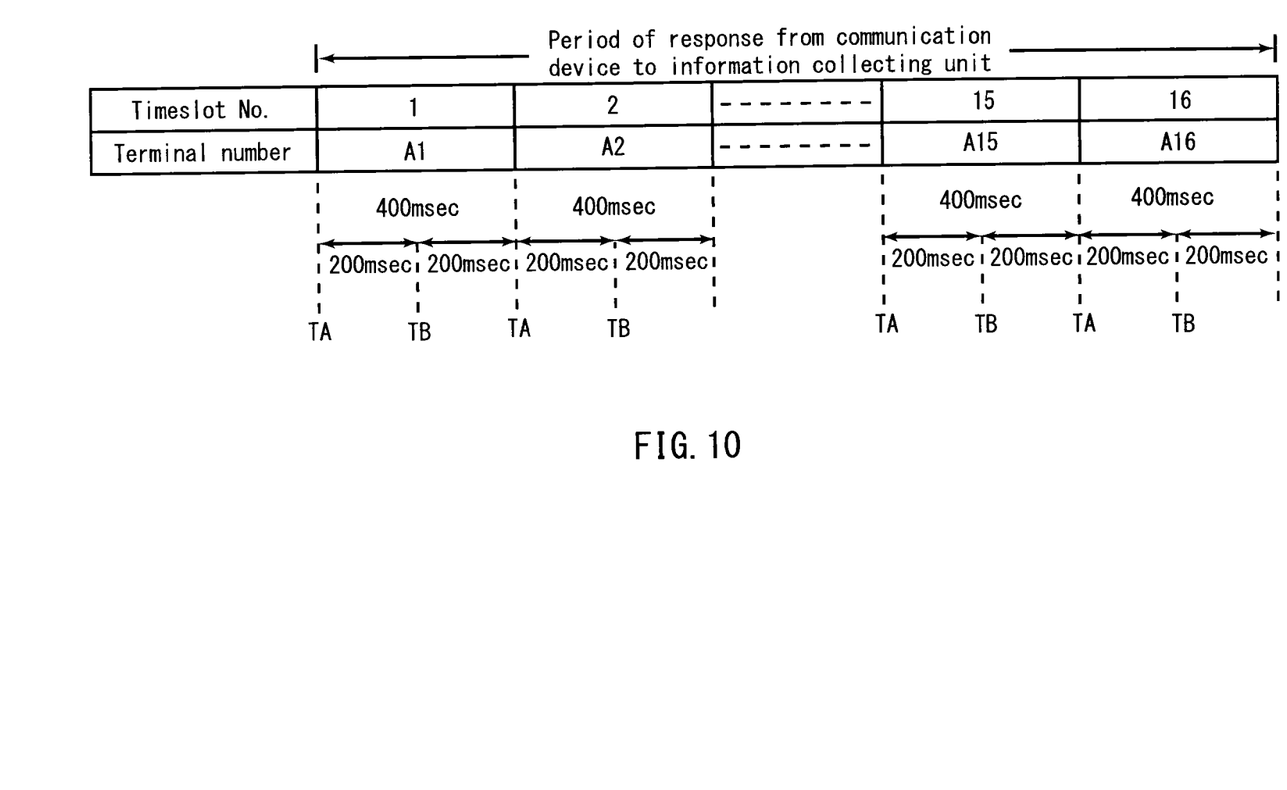
FIG. 10 shows the transmission timing of response packets in a second embodiment.
Figure 11:
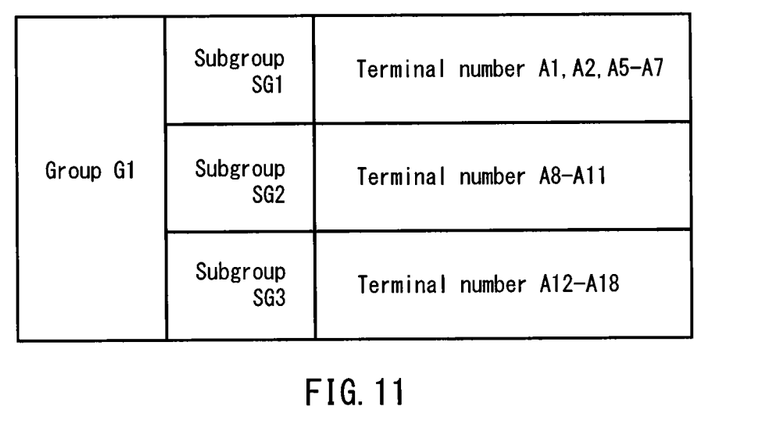
FIG. 11 shows the subgrouping in a third embodiment.

FIG. 10 shows the timeslot used to transmit the response packet 220 first in response to the broadcast packet 210, as well as the timeslots each used to transmit the broadcast retransmission packet 230 subsequently in response to the retransmission response packet 240.

The timeslot used to transmit the response packet 220 first in response to the broadcast packet 210 is the same as the timeslot described in the first embodiment. More specifically, the communication devices A1 to A16 are assigned with timeslots numbered 1 to 16, which are at intervals of 400 milliseconds.

FIG. 10 shows the two timeslots TA and TB to be used to transmit the retransmission response packet 240 subsequently in response to the broadcast retransmission packets 230. The timeslot TA has an offset of 0 milliseconds among the timeslots corresponding to the randomly selected terminal number. The timeslot TB has an offset of 200 milliseconds among the timeslots corresponding to the randomly selected terminal number. In other words, the timeslot TA is the same as the timeslot used to transmit the first response packet 220, whereas the timeslot TA is delayed from the timeslot used to transmit the first response packet 220 by 200 milliseconds.

As in the first embodiment, the terminal number A4 is assumed to be erroneously set in the terminal number setting unit 15 of the communication device A3. To transmit the retransmission response packet 240, the communication device A3 first randomly selects a terminal number. When the randomly selected terminal number is the terminal number A9, which is included in the response confirmation information 231, the communication device A3 can determine that the timeslot corresponding to the terminal number A9 is to be used. The communication device A3 then further randomly selects one of the timeslots TA and TB. When the timeslot TA is selected, the communication device is assigned with a response period that is 3200 milliseconds after the reception of the broadcast retransmission packet 230. When the timeslot TB is selected, the communication device is assigned with a response period that is 3400 milliseconds after the reception of the broadcast retransmission packet 230.

In this manner, when the response packet 220 transmitted in response to the broadcast packet 210 fails to be received normally, the communication device 10 in the second embodiment also uses the timeslot of another communication device for retransmission as in the first embodiment. The present embodiment prepares two different timeslots corresponding to the terminal number of the other communication device. This reduces the likelihood of the collisions between the retransmission response packets 240 further.

Third Embodiment

A third embodiment of the present invention will now be described. The third embodiment is a modification from the first embodiment. In the third embodiment, the communication system 1 has the same configuration and the communication device 10 has the same configuration and the same functions as in the first embodiment described with reference to FIGS. 1 to 7.

As described with reference to FIG. 9 and other figures, the broadcast retransmission packet 230 stores the response confirmation information 231 identifying the terminal numbers of the communication devices 10 that have successfully transmitted their response packets 220. In the third embodiment, the terminal numbers included in the response confirmation information 231 are further divided into subgroups.

FIG. 10 shows the subgrouping of the terminal numbers included in the response confirmation information 231. As in the first embodiment, the terminal number A4 is assumed to be erroneously set in the terminal number setting unit 15 of the communication device A3. The response packets 220 transmitted by the communication devices A3 and A4 collide with each other, and the information processing unit 20 fails to receive the response packets 220 from the communication devices A3 and A4. In this case, the response confirmation information 231 includes the terminal numbers A1, A2, and A5 to A16. As shown in the figure, the terminal numbers are divided into subgroups such that the terminal numbers A1, A2, and A5 to A7 belong to a subgroup SG1, the terminal numbers A8 to A11 belong to a subgroup SG2, and the terminal numbers A12 to A18 belong to a subgroup SG3.

When each communication device 10 receiving the broadcast retransmission packet 230 determines that its terminal number is not included in the response confirmation information 231, the communication device 10 performs a response retransmission process. The communication device 10 first randomly selects one of the subgroups SG1 to SG3, and then randomly selects a terminal number. When the randomly selected terminal number matches any terminal number included in the selected subgroup, the communication device uses the timeslot corresponding to the selected terminal number. The terminal number may be randomly selected from all the terminal numbers A1 to A16, or from only the terminal numbers included in the selected subgroup SG1.

In the third embodiment, when the response packet 220 transmitted in response to the broadcast packet 210 fails to be received normally, the communication device 10 uses the timeslot of another communication device to retransmit a response. In the third embodiment, the terminal numbers are divided into subgroups. The third embodiment thus involves two random selections, namely, random selections of the subgroup and the terminal number. This allows the packet collisions to be prevented with different likelihoods for different terminal numbers.

When, for example, the terminal numbers are divided into subgroups such that the same number of terminal numbers belong to each subgroup, the system prevents the collisions between retransmission response packets 240 with the same likelihood as when the terminal numbers are not divided into subgroups. In this case, the collisions of retransmission response packets 240 can occur with the same likelihood for all the terminal numbers.

When the terminal numbers are divided into subgroups such that a differing number of terminal numbers belong to each subgroup, the collisions of retransmission response packets 240 can occur with different likelihoods for different subgroups of terminal numbers. This allows, for example, subgroups including many terminal numbers to have lower likelihoods of packet collisions than other subgroups, and also allows such subgroups including many terminal numbers to have lower likelihoods of packet collisions than the communication devices in the first embodiment in which the terminal numbers are not divided into subgroups. In the example of FIG. 10, selecting the subgroup SG1 allows for transmission of the retransmission response packets 240 with smaller likelihoods of collisions than in the first embodiment.

Other Embodiments

Although the above embodiments describe the case in which a broadcast packet 210 is transmitted by the information processing unit 20, the communication system of the embodiments may perform multicast communications of various other packets, such as multicast packets.

The above embodiments describe the case in which the terminal number of another device may be erroneously set in the terminal number setting unit 15. This assumes the case in which the terminal number setting unit 15 uses, for example, a dual in-line package (DIP) switch, with which an operator may simply set an incorrect terminal number. This may alternatively assume another case in which an operator forgets to change the terminal number setting when the communication device 10 having a preset terminal number is moved into a different environment due to, for example, changes in the network configuration.

In the above embodiments, a terminal number or a subgroup is randomly selected when the retransmission response packet 240 is to be transmitted. Such random selection may be performed by using, for example, an algorithm for generating random numbers, such as a linear congruential generator.

INDUSTRIAL APPLICABILITY

The communication system 1 of the embodiments may be used as, for example, a system for measuring consumption power. The communication system 1 may be installed in a house and may be used to monitor power consumption of electric appliances used in the house. The communication device 10 may be connected to each power outlet in the house to measure the power of each electric appliance. In this case, the communication device 10 may include an interface to which the electric appliances are connected, and a circuit for measuring the power.

The information collecting unit 20 is connected to the power line and collects information indicating the power of each electric appliance from the communication devices 10. The information collecting unit 20 transmits a broadcast packet 210 to each group of communication devices 10 to request information from these communication devices. Each communication device 10 then provides information about the measured power by transmitting a response packet 220. The communication device 10 transfers the broadcast packet 210 and the response packet 220 by using both cable communication and wireless communication, and thus achieves highly reliable communication even when any of the communication media undergoes deteriorating communication conditions.

When the response packets 220 from the communication devices 10 collide with each other and the information collecting unit 20 fails to receive a response packet 220 transmitted from any communication device, the information collecting unit 20 can smoothly receive the retransmission response packet 240 by using the method for retransmission according to the first to third embodiments described above.

Having described the invention as related to the embodiments shown in the accompanying drawings, it is our intention that the invention not be limited by any of the details of description, otherwise specified, but rather be construed broadly within its spirit and scope as set out in the accompanying claims.

The invention claimed is:

1. A communication system, comprising:
    a transmitter comprising a communication unit including interface circuitry for transmitting and/or receiving a packet; and
    first to N-th receivers configured to receive a broadcast packet transmitted from the transmitter,
    wherein each receiver includes a communication unit including interface circuitry for transmitting and/or receiving a packet, a setting unit configured to set identification information for uniquely identifying the receiver, and a response control unit configured to transmit, when receiving the broadcast packet, a response packet to the transmitter by using a timeslot unique to the receiver that is determined based on the identification information set in the setting unit, and
    the transmitter includes a retransmission control unit configured to transmit a broadcast retransmission packet when the transmitter that has transmitted the broadcast packet fails to receive a response packet from any one of the receivers, and the broadcast retransmission packet includes response confirmation information including identification information identifying all receivers that have successfully transmitted response packets, and
    the response control unit of each receiver includes a determination unit configured to refer to the response confirmation information and determine whether the response packet transmitted from the receiver has been received by the transmitter, and a retransmission response control unit configured to (1) transmit no response packet to the transmitter when determining that the response packet transmitted from the receiver has successfully received by the transmitter, and (2) transmit a retransmission response packet to the transmitter by using a timeslot unique to another receiver that is determined based on identification information identifying the other receiver that has successfully transmitted a response when determining that the response packet transmitted from the receiver fails to be received by the transmitter.

2. The communication system according to claim 1, wherein
    the retransmission response control unit transmits the retransmission response packet by using a timeslot determined based on identification information randomly selected from the response confirmation information when the response packet transmitted from the receiver fails to be received by the transmitter.

3. The communication system according to claim 2, wherein
    the retransmission response control unit divides the timeslot that has been determined based on the randomly selected identification information into a plurality of partial timeslots and transmits the retransmission response packet by using a timeslot randomly selected from the plurality of partial timeslots.

4. The communication system according to claim 1, wherein
    the identification information included in the response confirmation information is divided into first to M-th groups, and
    the retransmission response control unit randomly selects a group from the first to M-th groups when determining that the response packet transmitted from the receiver fails to be received by the transmitter, and transmits the retransmission response packet by using a timeslot determined based on identification information, which is included in the selected group, randomly selected from the response confirmation information.

* * * * *